United States Patent [19]

Blattmann

[11] Patent Number: 5,800,122
[45] Date of Patent: Sep. 1, 1998

[54] BEARING CLEARANCE ADJUSTMENT DEVICE

[75] Inventor: Urs J. Blattmann, Garibaldi Highlands, Canada

[73] Assignee: Toyo Pumps North America Corp., Burnaby, Canada

[21] Appl. No.: 831,704

[22] Filed: Apr. 10, 1997

[51] Int. Cl.[6] .................................................. F01D 25/16
[52] U.S. Cl. ........................ 415/229; 415/131; 415/132; 384/517; 384/563
[58] Field of Search .......................... 415/229, 230, 415/231, 131, 132, 174.1; 417/423.12, 365; 384/517, 519, 563, 583, 556

[56] References Cited

U.S. PATENT DOCUMENTS

| | | |
|---|---|---|
| 427,887 | 5/1890 | Muir . |
| 811,035 | 1/1906 | Chindeuster . |
| 1,736,426 | 11/1929 | Bond .................................... 415/229 |
| 1,821,976 | 9/1931 | Holland-Letz . |
| 1,953,354 | 4/1934 | Holland-Letz . |
| 1,966,781 | 7/1934 | Wyrick . |
| 2,004,263 | 6/1935 | Wyrick . |
| 2,185,304 | 1/1940 | Knapp . |
| 2,230,899 | 2/1941 | McGrath . |
| 3,638,974 | 2/1972 | Stratienko .................. 287/52.06 |
| 3,881,841 | 5/1975 | Straniti ........................... 415/131 |
| 4,376,592 | 3/1983 | Martinek ........................... 403/26 |
| 4,530,144 | 7/1985 | Hagelthorn ........................ 29/407 |
| 4,613,240 | 9/1986 | Hagelthorn ....................... 384/585 |
| 4,629,350 | 12/1986 | Siewart et al. .................... 403/11 |
| 4,629,354 | 12/1986 | Freese ............................. 403/261 |
| 4,869,694 | 9/1989 | McCormick ...................... 440/83 |
| 4,941,790 | 7/1990 | Kim ................................ 411/432 |
| 4,966,474 | 10/1990 | Geiger ............................ 384/517 |
| 5,029,461 | 7/1991 | Lawrence et al. ............... 72/238 |
| 5,082,299 | 1/1992 | Beattie ............................ 279/1 |
| 5,374,128 | 12/1994 | Herbeck ........................... 384/49 |
| 5,590,968 | 1/1997 | Dretzka .......................... 384/563 |

Primary Examiner—Thomas E. Denion
Assistant Examiner—Richard Woo
Attorney, Agent, or Firm—Seed and Berry LLP

[57] ABSTRACT

An improved device for adjusting the bearing clearance of a pump is shown and described. In a preferred embodiment, an annular piston is provided adjacent to a bearing assembly, and an elastomeric member is provided adjacent to the piston. The elastomeric member has a plurality of apertures circumferentially spaced around the elastomeric member, a volume control member being provided in each of the apertures. The volume control members are selectively advanced into and retracted from the apertures, the elastomeric member being compressed and expanding in an axial direction when the volume control members are advanced into the apertures, thereby forcing the piston to move toward the bearing assembly. When the volume control members are retracted from the apertures, the elastomeric member compresses in an axial direction, thereby allowing the piston to move away from the bearing assembly. In this manner, the volume control members are selectively advanced into and retracted from the apertures, to re-establish the bearing clearance of the pump.

11 Claims, 2 Drawing Sheets

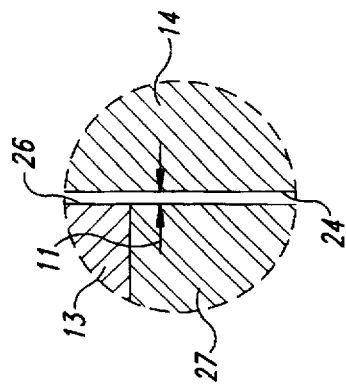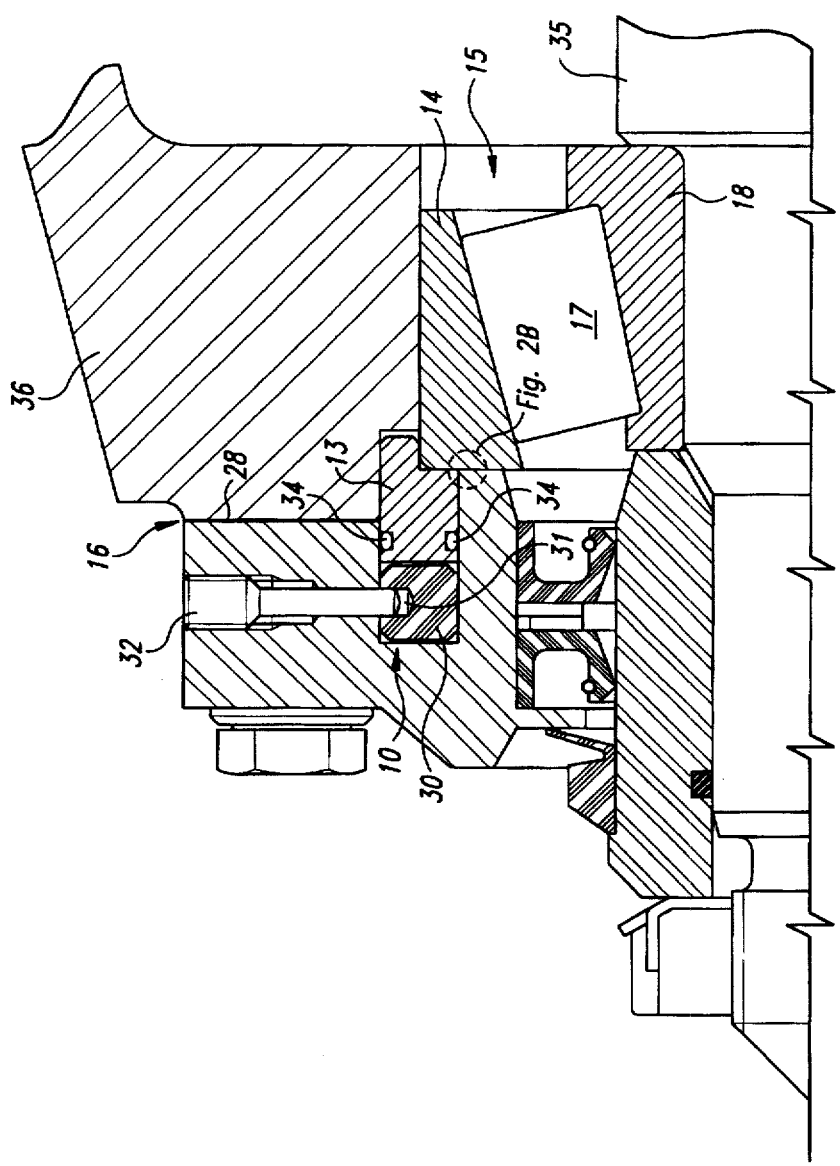
Fig. 2B
Fig. 2A

BEARING CLEARANCE ADJUSTMENT DEVICE

TECHNICAL FIELD

This invention relates to centrifugal pumps, and more particularly, to a device for adjusting the bearing clearance of a pump.

BACKGROUND OF THE INVENTION

Prior to operation of a pump having one or more bearing assemblies, the bearing assemblies are spaced from bearing end covers by a predetermined distance, commonly referred to as the bearing clearance. During operation of the pump, the bearing assemblies are subject to mechanical wear, which results in an increase of the bearing running clearances. Although such increases in the bearing clearances are tolerable to a certain extent, an excessive increase can cause accelerated wear, accompanied by rising levels of vibration and subsequent bearing failure. It is therefore important to maintain the bearing clearance within selected limits.

Currently available devices for adjusting the bearing clearance of a pump have several disadvantages. For example, currently available devices require that the pump be shut down and the bearing housing be partially disassembled, in order to re-establish normal bearing clearances. During this time, the pump is off-line, resulting in a loss of production. Other adjustment devices are difficult to control accurately, and once adjusted in a given direction, may not be moved in the opposite direction.

A need therefore exists for an improved device for adjusting the bearing clearances of a pump. The present invention fulfills this need, and provides further related advantages.

SUMMARY OF THE INVENTION

Briefly, the present invention provides an improved device for adjusting the bearing clearance of a pump. In a preferred embodiment, the device includes an annular piston provided adjacent to a bearing race, an end surface of the bearing race being spaced from an end surface of a bearing end cover by a selected distance. An annular elastomeric member is positioned adjacent to the annular piston, the elastomeric member having a plurality of apertures spaced circumferentially around the elastomeric member. A volume control member is provided in each of the apertures, and is selectively advanced into and retracted from the aperture. When the volume control members are advanced into the apertures, the elastomeric member expands in an axial direction, thereby forcing the annular piston to move towards the bearing race. When the volume control members are retracted from the apertures, the elastomeric member contracts in the axial direction, thereby allowing the piston to move away from the bearing race.

After operation of the pump, during which the bearing race is subjected to mechanical wear, the distance between the bearing race and the bearing end cover increases as compared to the initial selected distance. Left uncorrected, this increased bearing clearance will result in accelerated wear, increased vibration, and subsequent bearing failure. Therefore, the volume control members are selectively advanced into and retracted from the apertures in the elastomeric member, such that the annular piston is positioned adjacent to the bearing race, an end surface of the piston in effect acting as the end surface of the end cover. The bearing clearance is thereby re-established and the pump is returned to its normal operating state.

DETAILED DESCRIPTION OF THE DRAWINGS

FIG. 2A is an enlarged cross-sectional elevational view of the adjustment device illustrated in FIG. 1.

FIG. 2B is an enlarged detailed view of a portion of the pump assembly illustrated in FIGS. 1 and 2A.

DETAILED DESCRIPTION OF THE INVENTION

Figure 1:
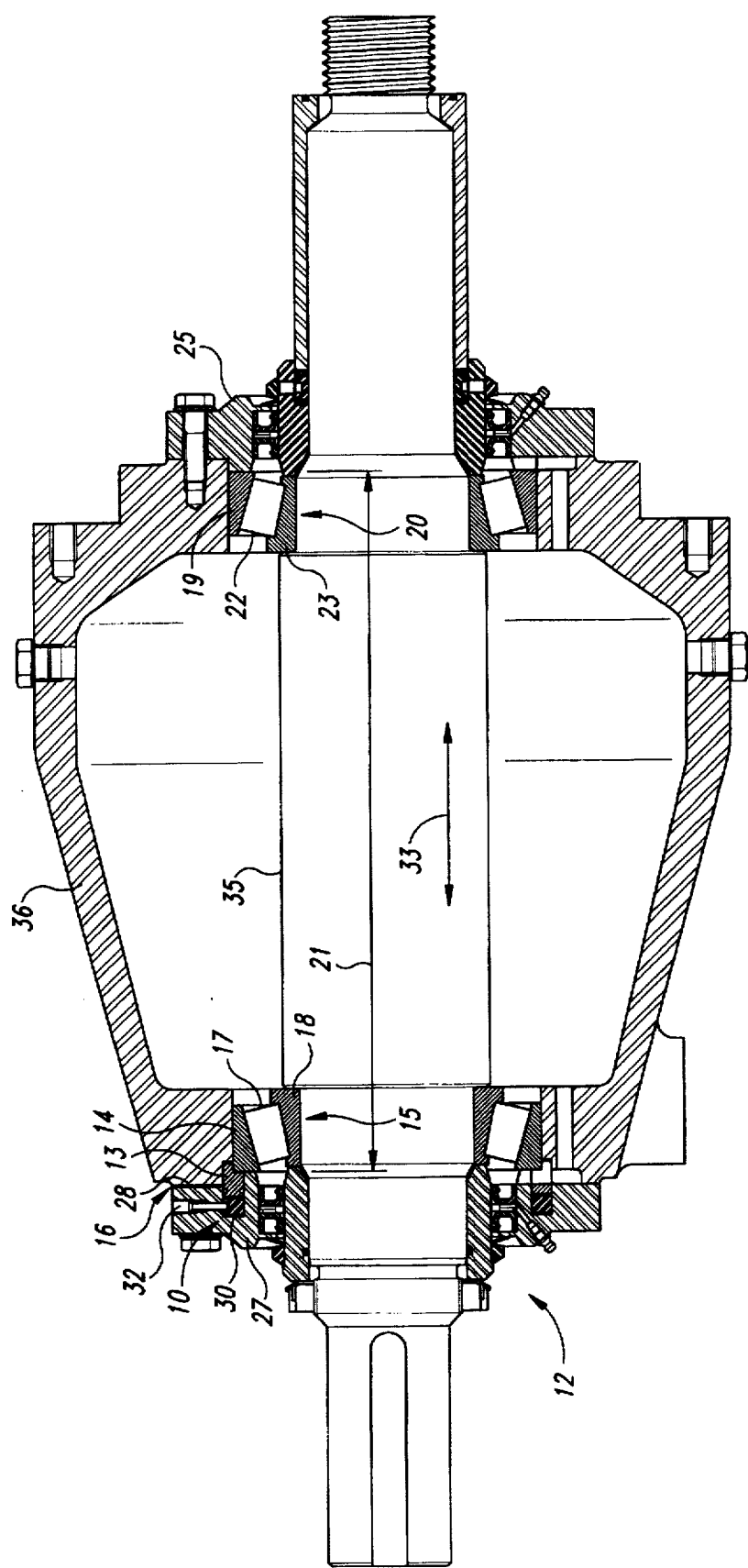
FIG. 1 is a cross-sectional elevational view of an adjustment device provided in accordance with a preferred embodiment of the present invention, installed in a pump assembly.

An improved device 10 for adjusting the bearing clearance 11 of a pump 12 is provided in accordance with a preferred embodiment of the present invention. As illustrated in FIG. 1, the pump 12 includes a bearing housing 36 provided on a pump shaft 35. An outboard bearing assembly 15 and inboard bearing assembly 20 are positioned on the pump shaft 35 within the bearing housing 36. The outboard bearing assembly 15 comprises an outer race 14, a roller assembly 17 and an inner race 18. Similarly, the inboard bearing assembly 20 includes an outer race 19, a roller assembly 22, and an inner race 23. Prior to operation of a pump, the bearing clearances 11 are established at a predetermined distance. As illustrated in FIG. 2B, the bearing clearance 11 is the distance between end surface 24 of outboard bearing race 14 and end surface 26 of outboard bearing end cover 27. Similarly, the outer race 19 of inboard bearing assembly 20 is spaced from the inboard bearing end cover 25 by the predetermined distance. Although this distance may be set in any conventional manner, in a preferred embodiment, a shim 28 having a width equivalent to the desired bearing clearance is inserted at juncture 16 between the bearing housing 36 and end cover 27. The initial bearing race setting 21, as measured between the outer surface of the outboard bearing outer race 14 and the outer surface of inboard bearing outer race 19, is thereby established. This in turn establishes bearing clearances 11.

During operation of the pump, the bearing assemblies 15 and 20 are subject to mechanical wear, which results in an increase of the bearing clearances. An unacceptable increase in the bearing clearances 11 will result in increased vibrations. Such an increase in the bearing clearances 11 may therefore be detected during operation of the pump, via use of a vibration probe. If an unacceptable increase is detected, the bearing clearances 11 are re-established by use of the adjustment device 10 provided in accordance with a preferred embodiment of the present invention.

As illustrated in FIGS. 1 and 2A, the adjustment device 10 includes an annular piston 13 provided adjacent to the outboard bearing outer race 14. Given the axial load on the pump shaft 35, the adjustment device 10 is preferably positioned adjacent to the outboard bearing assembly 15, such that the adjustment device is not required to overcome as great a load.

An annular elastomeric member 30 is provided adjacent to the piston 13, the elastomeric member 30 being provided with a plurality of apertures 31, spaced circumferentially on the elastomeric member. A volume control member 32 is provided in each of the apertures 31, the volume control members being selectively advanced into and retracted from the apertures. In a preferred embodiment, the volume control members 32 are screws.

In order to adjust the bearing clearance of the pump, the volume control members 32 are advanced into the apertures 31, thereby compressing the elastomeric member 30, the elastomeric member expanding in an axial direction 33. The expansion of the elastomeric member 30 in an axial direction forces the piston 13 to move toward the bearing race 14, the piston acting through the outboard bearing assembly 15 and pump shaft 35 to position the inboard bearing assembly 20 at a desired location adjacent inboard bearing end cover 25. If the piston is advanced too far, the volume control members 32 are retracted from the apertures 31, thereby allowing the elastomeric member 30 to contract in the axial direction, thereby allowing the piston to move away from the outboard bearing assembly 15. The volume control members are therefore selectively advanced into and retracted from the apertures to re-establish bearing clearances 11, an end surface of the piston 13 in effect taking the place of the end surface 26 of outboard bearing end cover 27. The bearing clearances are thus reestablished, and the pump is returned to its normal operating state.

If a vibration probe is used to detect unacceptable increases in the bearing clearances 11, the volume control members 32 are advanced until the vibration stops. If the bearing clearances are re-established at a distance that is less than the desired value, an unacceptable rise in temperature will occur, which when detected, is corrected by retracting the volume control members from the apertures. If it is possible or desirable to adjust the bearing clearances while the pump is not operating, it is also possible to measure the bearing clearances with a conventional dial indicator.

In a preferred embodiment, as illustrated in FIGS. 1 and 2A, the volume control members are exposed to the atmosphere and are therefore easily accessible, such that a user may advance and retract the volume control members without shutting the pump down.

As best seen in FIG. 2A, the piston 13 is provided with a sealing member 34, such as an O-ring, the elastomeric member 30 and sealing member 34 forming a seal with the bearing end cover 27. As a result, the elastomeric member 30 and piston 13 are shielded from the media in which the pump operates.

Although the elements of the device 10 may be made of a variety of materials, in a preferred embodiment, the piston is made of carbon steel, and the elastomeric member 30 is made of a fluor-elastomer, such as Dupont® Viton®.

A device for adjusting the bearing clearance of a pump has been shown and described. From the foregoing it will be appreciated that, although specific embodiments of the invention have been described herein for purposes of illustration, various modifications may be made without deviating from the spirit and scope of the invention. Thus, the present invention is not limited to the embodiments described herein, but rather is defined by the claims which follow.

I claim:

1. A device for adjusting the bearing clearance of a pump, comprising:

an annular piston provided adjacent to a bearing race, an end surface of the bearing race being spaced from an end surface of a bearing end cover by a selected distance;

an annular elastomeric member positioned adjacent to the annular piston and having a plurality of apertures circumferentially spaced in the annular elastomeric member; and a volume control member provided in each of the apertures, the volume control members being selectively advanced into and retracted from the apertures, the elastomeric member expanding in an axial direction to move the piston towards the bearing race when the volume control members are advanced into the apertures, and the elastomeric member contracting in the axial direction such that the piston moves away from the bearing race when the volume control members are retracted from the apertures.

2. The device according to claim 1 wherein the volume control members are easily accessible such that a user may advance and retract the volume control members without shutting the pump down.

3. The device according to claim 1 wherein the volume control members are screws.

4. The device according to claim 1 wherein the piston is positioned adjacent to an outboard bearing race.

5. The device according to claim 4 wherein the outboard bearing race is coupled to an inboard bearing race, and the elastomeric member expands sufficiently in the axial direction to push the inboard bearing race to a desired position adjacent an inboard bearing end cover via the outboard bearing race and the piston, the piston being spaced from the outboard bearing race by the selected distance.

6. The device according to claim 1 wherein a sealing member is provided on the piston, the elastomeric member and the sealing member forming a seal with the bearing end cover, such that the elastomeric member and piston are shielded from the media in which the pump operates.

7. A pump assembly, comprising:

a pump having a bearing housing positioned on a pump drive shaft;

an inboard bearing assembly coupled to the pump drive shaft within the bearing housing;

an outboard bearing assembly coupled to the pump shaft within the bearing housing; and a bearing adjustment device positioned adjacent to the outboard bearing assembly, the bearing adjustment device having an annular piston positioned adjacent to the outboard bearing assembly, an end surface of the outboard bearing assembly being spaced from an end surface of an outboard bearing end cover by a selected distance, an annular elastomeric member being positioned adjacent to the piston and having a plurality of circumferentially spaced apertures, a volume control member being provided in each of the apertures, the volume control members being selectively advanced into and retracted from the apertures, the elastomeric member expanding in an axial direction to move the piston towards the outboard bearing assembly when the volume control members are advanced into the apertures, and the elastomeric member contracting in the axial direction such that the piston moves away from the outboard bearing assembly when the volume control members are retracted from the apertures.

8. The pump assembly according to claim 7 wherein the volume control members are easily accessible such that a user may advance and retract the volume control members without shutting the pump down.

9. The pump assembly according to claim 7 wherein the volume control members are screws.

10. The pump assembly according to claim 7 wherein the outboard bearing assembly is coupled to the inboard bearing assembly, and the elastomeric member expands sufficiently in the axial direction to push the inboard bearing assembly to a desired position adjacent an inboard bearing end cover via the outboard bearing assembly and piston, the piston being spaced from the outboard bearing assembly by the selected distance.

11. The pump assembly according to claim 7 wherein a sealing member is provided on the piston, the elastomeric member and the sealing member forming a seal with the bearing end cover, such that the elastomeric member and piston are shielded from the media in which the pump operates.

* * * * *